(12) United States Patent
Wolf

(10) Patent No.: US 9,724,707 B2
(45) Date of Patent: Aug. 8, 2017

(54) FLUID TREATMENT SYSTEM, A FLUID PROCESSING APPARATUS AND A METHOD OF TREATING A MIXTURE

(71) Applicant: NATIONAL OILWELL VARCO, L.P., Houston, TX (US)

(72) Inventor: Mark E. Wolf, Katy, TX (US)

(73) Assignee: National Oilwell Varco, L.P., Houston, TX (US)

( * ) Notice: Subject to any disclaimer, the term of this patent is extended or adjusted under 35 U.S.C. 154(b) by 496 days.

(21) Appl. No.: 13/724,833

(22) Filed: Dec. 21, 2012

(65) Prior Publication Data
US 2014/0175028 A1    Jun. 26, 2014

(51) Int. Cl.
| | | |
|---|---|---|
| *B01D 17/038* | (2006.01) | |
| *B04C 11/00* | (2006.01) | |
| *B01D 17/12* | (2006.01) | |
| *B04C 5/30* | (2006.01) | |
| *B01D 17/02* | (2006.01) | |

(52) U.S. Cl.
CPC .......... *B04C 11/00* (2013.01); *B01D 17/0217* (2013.01); *B01D 17/12* (2013.01); *B04C 5/30* (2013.01)

(58) Field of Classification Search
CPC .... B01D 17/02; B01D 17/0217; B01D 17/04; B01D 17/12; B01D 19/0057; B04C 5/00; B04C 5/30; B04C 9/00; B04C 11/00; B04C 2009/005
See application file for complete search history.

(56) References Cited

U.S. PATENT DOCUMENTS

| | | | | |
|---|---|---|---|---|
| 2,735,547 A | * | 2/1956 | Vissac | B04C 11/00 209/159 |
| 2,840,524 A | * | 6/1958 | Fitch | B03B 9/00 134/25.1 |
| 3,780,865 A | * | 12/1973 | Miller | B04C 3/00 210/195.1 |
| 3,810,347 A | * | 5/1974 | Kartinen | B01D 17/0217 95/253 |

(Continued)

FOREIGN PATENT DOCUMENTS

EP         0161813 A1    11/1985

OTHER PUBLICATIONS

International Search Report, PCT/EP2013/077355, mailed Jun. 3, 2014.

*Primary Examiner* — David C Mellon
(74) *Attorney, Agent, or Firm* — Derek V. Forinash; Porter Hedges LLP

(57) ABSTRACT

A fluid treatment system, a fluid processing apparatus and a method of treating a mixture are provided in which a separator has two outlets for different components of mixed fluid. A conduit connecting one of the outlets of the separator to the inlet of the separator is provided to recycle fluid from an outlet of the separator back to the inlet and a pump at the inlet of the separator regulates the fluid flow through the separator at a constant rate. As a result, the flow rate through the separator is increased, which increases the separation efficiency of the separation system. The conduit also functions as a bypass line should the flow of fluid be obstructed through the separator. The conduit may preferably be operated in conjunction with an energy harvester.

11 Claims, 6 Drawing Sheets

(56) References Cited

U.S. PATENT DOCUMENTS

| | | | |
|---|---|---|---|
| 4,151,083 A * | 4/1979 | Dove | B04C 5/103 162/55 |
| 4,283,232 A * | 8/1981 | Best | C08B 30/00 127/25 |
| 4,334,986 A * | 6/1982 | Frykhult | B01D 33/073 209/17 |
| 4,622,150 A * | 11/1986 | Carroll | B01D 17/0214 210/512.3 |
| 4,691,510 A | 9/1987 | Taylor et al. | |
| 4,844,812 A * | 7/1989 | Haynes | B01D 17/0214 210/104 |
| 4,900,445 A * | 2/1990 | Flanigan | B01D 17/0214 210/512.1 |
| 4,948,517 A | 8/1990 | Young et al. | |
| 5,000,766 A * | 3/1991 | Yano | B01D 19/0052 55/417 |
| 5,026,486 A * | 6/1991 | Wikdahl | B04C 5/28 162/258 |
| 5,298,167 A * | 3/1994 | Arnold | B01D 17/0208 210/703 |
| 5,320,755 A * | 6/1994 | Hagqvist | B01D 61/02 210/134 |
| 5,456,837 A * | 10/1995 | Peachey | B01D 17/0217 166/265 |
| 6,440,317 B1 * | 8/2002 | Koethe | B01D 17/0217 123/541 |
| 7,896,169 B2 * | 3/2011 | Levitt | B01D 21/003 209/12.1 |
| 2004/0079706 A1 * | 4/2004 | Mairal | B01D 17/02 210/651 |
| 2011/0062062 A1 * | 3/2011 | Takahashi et al. | 210/137 |

* cited by examiner

FLUID TREATMENT SYSTEM, A FLUID PROCESSING APPARATUS AND A METHOD OF TREATING A MIXTURE

FIELD OF THE INVENTION

The present invention relates to a cyclone apparatus for separating a mixture of two fluid components. In particular, the present invention relates to a cyclone apparatus for separating two immiscible liquids, such as oil and water.

BACKGROUND TO THE INVENTION

In oil production processes, a mixture of oil and water is often recovered. The mixture that is recovered in this way is unwanted and needs to be disposed of. However, it is not environmentally appropriate to dispose of water while it is still contaminated with oil. Therefore, there is a need to separate the oil from the water.

In practice, there are certain limitations on the apparatus that can be used for this separation. For onshore applications, large skim tanks in combination with flotation equipment have been used to remove oil from water. However, in certain urban oil production locations, the use of tanks and non-pressurized separation equipment is under scrutiny due to their emission of hazardous pollutants to the atmosphere as well as their large area footprint. In addition, the constraints of offshore oil production, such as the size of the offshore platform, require that the separation apparatus is both effective and compact. Over recent decades, cyclone separators have been developed to meet these requirements. Specifically, deoiling hydrocyclones for the removal of oil from water have become popular for offshore applications in the oil and gas industry.

A deoiling hydrocyclone separator operates by converting pressure energy into velocity as a fluid mixture of water and oil enters the hydrocyclone through a tangential inlet. This causes the fluid inside the hydrocyclone to spin, which creates a centrifugal force thousands of times higher than the force of gravity within the fluid. The centrifugal force multiplies the natural buoyancy of small oil droplets that have a relatively low density within the water, which has a relatively high density. Consequently, the heavier water phase is directed towards the edges of the hydrocyclone, while the lighter oil phase is retained at the center of the hydrocyclone. The two phases of oil and water can then be extracted from the hydrocyclone separately; the water is extracted via a clean water outlet while the oil is extracted via a waste reject line.

Compared with alternative separation devices, such as skim tanks, a hydrocyclone separator yields a much faster separation process within a smaller area because the active gravitational force in the skim tank is effectively replaced by centrifugal forces in the hydrocyclone, which are of a far higher magnitude. These high centrifugal forces also allow hydrocyclone separators to be relatively insensitive to motion and orientation, making them particularly ideal for offshore applications in the oil industry.

Nevertheless, there remain difficulties in implementing effective hydrocyclone separator systems at a reasonable cost with the required reliability. Existing deoiling hydrocyclone arrangements typically comprise a hydrocyclone separator that receives a mixture of water and oil from an upstream fluid store, and rejects the separated fluids via a clean water outlet and an oily waste outlet. Such systems require a substantial pressure drop between the inlet to the hydrocyclone and the oily waste outlet. Therefore, the upstream fluid store must be operated at a high pressure which can reduce the flow rate of fluids from oil wells feeding the upstream fluid store. The oily waste fluid must also be discharged to a low pressure receiving system.

Furthermore, it is necessary in this existing system to apply a back pressure to the hydrocyclone from the clean water outlet in order to ensure that the oily waste product is forced through the oily waste outlet. This is achieved using a control valve at the clean water outlet, across which a pressure differential is established and which dissipates pressure energy through turbulent friction. This control valve is automated to control the interface between the oil and water phases in the upstream fluid store at a constant level. As the rate of fluid entering the upstream fluid store varies over time, this control valve opens or closes in order to maintain the constant level, which causes a variable flow rate of fluid through the hydrocyclone. This creates a complication in the effective performance of the hydrocyclone system because it is often desirable to achieve a constant flow rate through the hydrocyclone.

Another example of a known hydrocyclone system, which addresses the problem of variable flow rate through the hydrocyclone and the need to operate the upstream fluid store at an elevated pressure, utilises a pump that draws fluid from the upstream fluid store and feeds the fluids to the hydrocyclone together with a plurality of automated control valves to regulate the flow of fluids in the hydrocyclone system. A first control valve is placed between the oily waste outlet of the hydrocyclone and the upstream fluid store and may be opened or closed as desired in order to regulate the flow of oily waste fluid back to the fluid store. This valve may also direct the oily waste to a lower pressure receiving system. A second control valve is placed between the clean water outlet of the hydrocyclone and the upstream fluid store in a similar way to the first control valve. The fluid connection between the clean water outlet and the upstream fluid store may be termed the "recycle line". A third control valve is also placed at the clean water outlet of the hydrocyclone. This control valve is automated to control the interface between the oil and water phases in the upstream fluid store at a constant level, and regulates the flow of fluid leaving the hydrocyclone separator system according to the interface level in the upstream fluid store.

A problem with this configuration is that, should there arise a situation whereby the hydrocyclone requires to be taken out of service for maintenance or its fluid channels become obstructed, or if its capacity becomes insufficient to maintain a constant level in the upstream fluid store, then a separate bypass line must be added in order to avoid the entire hydrocyclone system being taken offline. However, known bypass lines require manually operated valves in order to bypass fluids around the hydrocyclone system. This introduces a lag time between the identification of an obstruction or capacity constraint and manually adjusting the valves to create the bypass.

There is an ongoing desire to improve fluid separation apparatus for use in onshore and offshore oil operations and elsewhere. In particular, there is a desire to increase the separation efficiency of the hydrocyclone system and maintain a constant flow rate of fluid through the hydrocyclone while simultaneously retaining reliability of the system and avoiding prohibitive expenses.

SUMMARY OF THE INVENTION

According to a first aspect of the present invention, there is provided a fluid treatment system for separating a mixture of a first fluid and a second fluid, comprising:

a separator comprising a separating chamber, an inlet for receiving the mixture, a first outlet for discharge of the first fluid from the separating chamber and a second outlet for discharge of the second fluid from the separating chamber;

a conduit connecting the first outlet to the inlet of the separator that allows fluid communication between the first outlet and the inlet of the separator; and a pump at the inlet of the separator that is arranged to draw fluid from the conduit and the mixture of the first fluid and the second fluid.

The conduit that connects the first outlet to the inlet of the separator allows fluid communication between the first outlet and the inlet of the separator, i.e. it recycles or bypasses fluid around the separator. Therefore, the pump that is positioned at the inlet to the separator is arranged to draw in fluid from both the untreated mixture and the first outlet. Preferably, the pump is operated to draw in fluid at a constant flow rate that is higher than the maximum instantaneous flow rate of the untreated mixture of water and oil. This ensures both increased and constant flow rate of fluid through the separator, which in turn creates an increased and constant separation efficiency of the separation system.

The separator is preferably a cyclone separator, more preferably a hydrocyclone separator. Cyclone separators are particularly efficient and compact.

In preferred embodiments, the first fluid has a greater density than the second fluid. Moreover, the first and second fluids may be liquids, and in particular the first fluid may be water while the second fluid may be oil.

The fluid treatment system may further comprise an energy harvester arranged to harvest pressure energy from the first fluid in the first outlet and an energy transfer mechanism arranged to transfer the harvested energy to the pump. The provision of an energy harvester is particularly beneficial in the context of a cyclone separator because it provides a useful back pressure which ensures that fluid is output through both separator outlets while simultaneously using the pressure drop created across the harvester to obtain energy that can be used to drive the pump coupled to the separator inlet. As such, the input pressure can be increased, thereby increasing the separation efficiency and throughput of the separator. In particular, the present invention may be understood to recycle energy from the outlet to the inlet of the hydrocyclone that would otherwise be lost if conventional mechanisms such as valves were used.

The provision of a useful back pressure by the energy harvester together with the use of the conduit allows a low shear pressure drop to be created at the first outlet of the separator. In this respect, embodiments of the invention that include an energy harvester provide the advantage that the back pressure needed to force fluid flow out of the second outlet of the separator does not have to be associated with a pressure reducing control valve at the first outlet of the separator. The action of such a control valve introduces turbulent shear forces within the control valve, which cause a reduction in the average oil droplet size reaching further separation processes downstream of the separator. The efficiency of these downstream processes typically has a strong dependency on the size of the oil droplets within the mixture; larger oil droplet sizes result in improved oil removal efficiency, while smaller droplets result in reduced efficiency. Therefore, the oil removal efficiency of downstream processes is greatly reduced by the pressure reducing control valve. This problem is alleviated through the use of the energy harvester and the removal of the pressure reducing control valve.

It is envisaged that a filter element may be used in replacement of or in conjunction with the pressure reducing control valve in order to create the pressure drop at the first outlet of the separator. The filter element reduces the turbulent shear forces that would be otherwise found at the outlet of the control valve. However, the filter element requires regular maintenance and replacement, during which the entire fluid treatment system must be taken offline, thus reducing the efficiency of the system. Furthermore, in the absence of the pressure reducing control valve, the filter element itself contains no control aspects, and therefore lacks the operational flexibility of a control valve. Accordingly, the creation of a back pressure for the separator through use of an energy harvester provides distinct advantages over the use of a filter element in its reliability and its additional functionality as will be described below.

In preferred embodiments, the energy harvester is arranged to convert pressure energy into mechanical energy. This may find particular advantages where, for example, the pump is mechanically actuated. In such examples, the mechanical energy harvested by the energy harvester may be directly transmitted to the pump. In other circumstances, the energy harvester may be arranged to convert pressure energy to electrical energy, for example.

In some preferred embodiments, the energy harvester comprises a rotating shaft. More preferably, the energy harvester comprises a progressive cavity pump. In this case, the fluid in the first fluid outlet causes the rotating shaft of the progressive cavity pump to rotate as it passes through, thus converting pressure energy in the fluid to mechanical energy.

Such an embodiment finds particular advantages when the pump also comprises a rotating shaft. For example, the pump may also be a progressive cavity pump. The rotational movement generated in the progressive cavity pump of the energy harvester may therefore be simply connected to the rotating shaft of the pump, which can act as a drive shaft. In this way, the energy obtained by the energy harvester can be efficiently applied to the pump.

Preferably, the energy transfer mechanism is arranged to ensure that a fixed ratio of fluid passes through the pump and the energy harvester. Since this will fix the ratio of the fluid passing through the inlet and the first outlet, it will also have the effect of controlling the proportion of fluid in the second outlet. In this way, one can avoid the need for a control system or the like to control the flow of fluid from the second outlet of the separator while retaining desired proportions of fluid in the first and second outlets.

The energy transfer mechanism may, for example, comprise a torque transfer device. For example, where the pump and the energy harvester both comprise rotating shafts, the energy transfer mechanism may be a gearing system which controls the relative rates of rotation of these shafts. This is a mechanically simple, and thus reliable and inexpensive, approach to ensure a fixed ratio of fluids flow through the separator.

According to a second aspect of the present invention, there is provided a fluid processing apparatus comprising a fluid treatment system as described above, a control valve after the conduit, the control valve operating to control the flow of fluid leaving the fluid processing apparatus, and a fluid store, wherein the fluid treatment system receives fluid from the fluid store via the pump.

Preferably, the fluid store is an upstream pre-separator vessel, more preferably a free water knock out, skim tank, or other type of oil and water separator. In these vessels, a natural separation of fluids with different densities occurs over time. For example, a mixture of water and oil that is fed into the upstream fluid store may naturally separate into three components, with water at the bottom, oil at the top and a mixture of water and oil in the middle. In such a formation, it is possible to skim oil from the top of the fluids in the fluid store as a pre-separator separation treatment.

Preferably, the second outlet of the separator is in fluid communication with the fluid store. In the example whereby the second outlet of the separator is arranged to receive oily waste fluid and return it to the fluid store, this eliminates the need for an oily reject collection tank. In some arrangements, there may be a valve between the second outlet of the separator and the fluid store.

In a preferred fluid processing apparatus, the fluid processing apparatus further comprises a control valve after the conduit, which is automated to open and close in order to allow fluid to leave the fluid treatment system. Preferably, this control valve is coupled to the fluid store such that it is automated to control the interface between the oil and water phases in the upstream fluid store at a constant level. As the rate of fluid flow entering the upstream fluid store varies over time, the control valve is opened or closed in order to maintain the constant interface level. Simultaneously, the pump at the input of the separator is operated to regulate the flow rate of fluid through the separator at a constant rate. One advantage of the pumped arrangement and a constant flow rate through the separator is a corresponding constant separation efficiency of the separator, thereby producing a predictable output of the system. Another advantage of the pumped arrangement is that pressure difference between the upstream fluid store and the oil and water outlets is no longer required because a pressure difference between the inlet and the outlets of the separator is provided by the pump. Consequently, the upstream fluid store can be operated at any pressure that is appropriate, for example, at atmospheric pressure, irrespective of the pressure required by the separator.

Further, the placement of the conduit between the first outlet of the separator and the inlet to the pump provides the advantage that there is no need to make alterations to the fluid store in order to implement the present invention upon existing fluid processing apparatus. This is contrasted with known fluid processing apparatus where the recycle line which connects the first outlet of the separator back to the fluid store requires making alterations to the fluid store. This is particularly advantageous in industrial applications where it may be difficult to make modifications to existing fluid stores.

The placement of the conduit within the fluid processing apparatus further provides an advantage over the known recycle line in that the overall fluid processing apparatus may continue to operate even if fluid flow through the hydrocyclone is obstructed. In this situation, the pump may be switched off and fluid may freely flow from the fluid store to the outlet of the fluid processing apparatus, albeit untreated. This avoids the need for the entire fluid processing apparatus to be taken offline, which increases costs and reduces system efficiency due to the downtime. This is contrasted with the limitations of the recycle line, which only allows fluid flow in one direction from the first outlet of the separator back to the fluid store and therefore could not act as a bypass line should the separator break down. Known fluid processing apparatus can only emulate the two-way flow of the conduit of the present invention by introducing a separate bypass line between an outlet and the inlet of the separator together with a plurality of additionally manually controlled valves. These extra components require manual operation, and reduce the reliability of the fluid processing apparatus.

In some arrangements, one or more additional fluid treatment elements may be introduced to the fluid treatment apparatus. For example, these additional treatment elements may comprise de-sanding cyclones and/or filters for the removal of solids, coalescers for the separation of emulsions, electro-coagulators for the removal of contaminants or ultraviolet and ultrasonic fluid disinfectants. The position of the additional fluid treatment elements within the fluid processing apparatus is dependent on its specific purpose.

According to a third aspect of the present invention, there is provided a method of treating a mixture of a first fluid and a second fluid, comprising:
 receiving the mixture into a separator;
 regulating the flow rate of fluid entering the inlet of the separator using a pump;
 separating the mixture of the first fluid and the second fluid in the separator;
 discharging the first fluid through a first outlet of the separator;
 discharging the second fluid through a second outlet of the separator; and
 recycling the first fluid from the first outlet through a conduit back towards the inlet of the separator via the pump.

Preferred features of the first and second aspect of the invention may be equally applied to the third aspect of the invention.

BRIEF DESCRIPTION OF THE DRAWINGS

Embodiments of the present invention will now be described, by reference to the accompanying drawings, in which.

DETAILED DESCRIPTION

Figure 1:
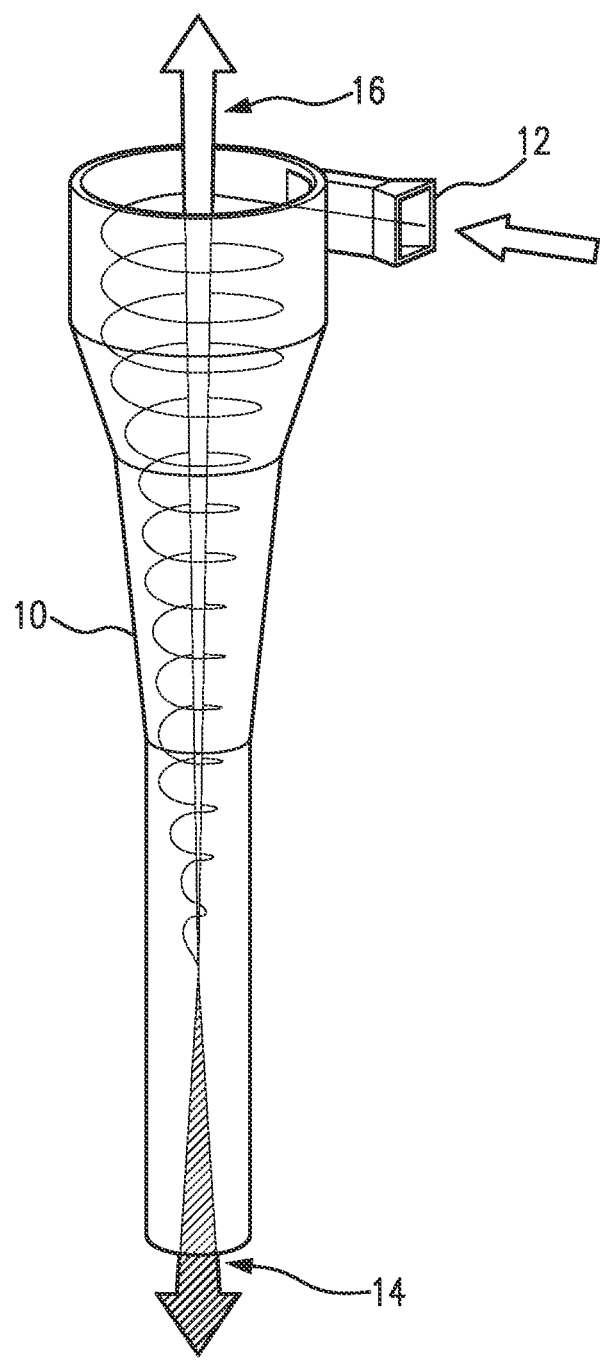
FIG. 1 illustrates a cyclone separator.

Referring to FIG. 1, a fluid treatment system is shown comprising a de-oiling hydrocyclone separator 10, an inlet 12, a clean water outlet 14 and an oily waste outlet 16. The separator 10 is designed to separate oil from water by inducing a cyclone within the separator 10. The water outlet 14 and the oily waste outlet 16 are illustrated figuratively, with arrows indicating the direction of movement of fluid through these features, but the skilled person will appreciate that in practice they are implemented using physical pathways.

Figure 2:
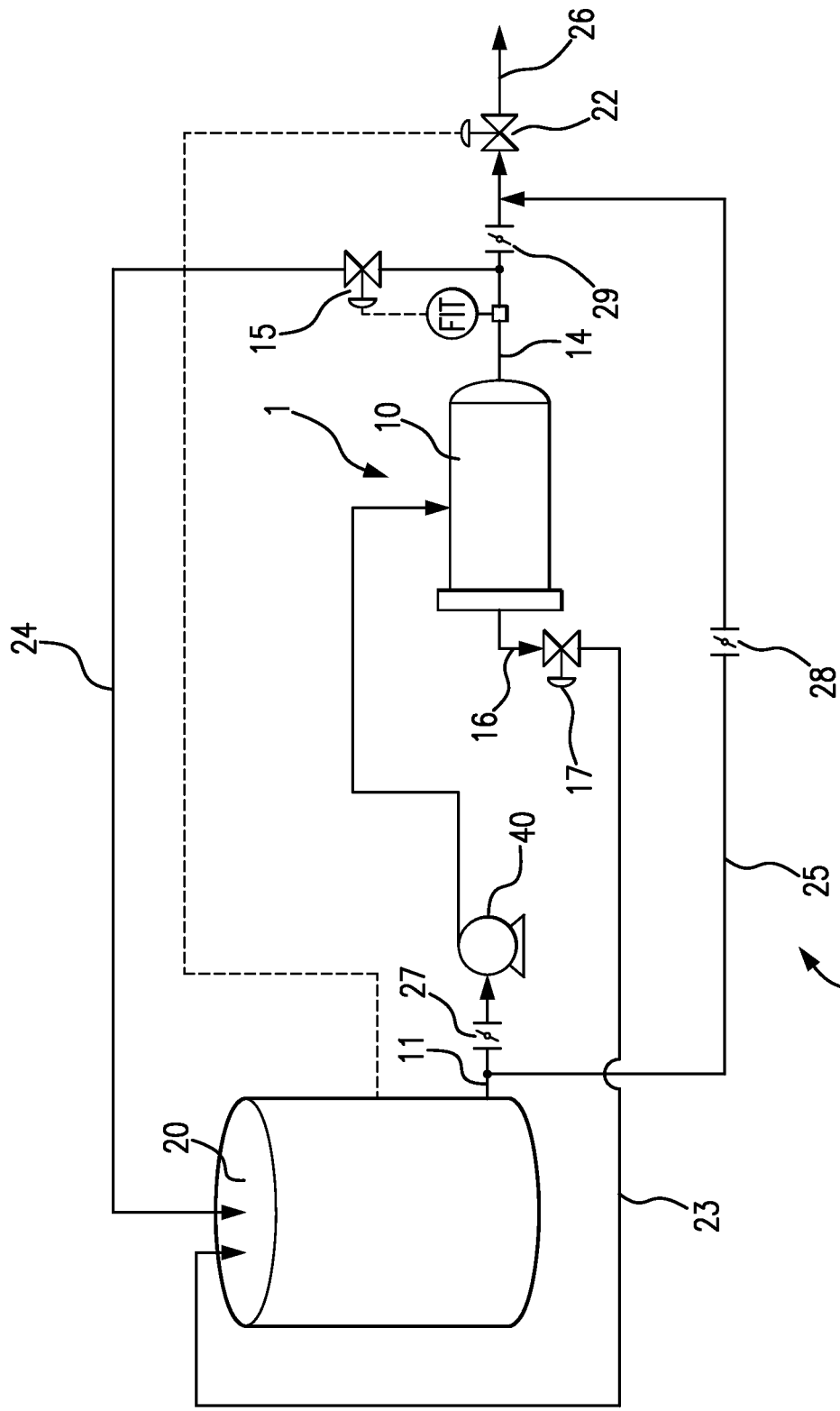
FIG. 2 illustrates a prior art fluid processing apparatus.

The position of fluid treatment system 1 comprising separator 10 within a known fluid processing apparatus 2 is shown in FIG. 2. In FIG. 2, the fluid processing apparatus 2 comprises an initial fluid store 20, which contains a mixture of oil and water. The fluid store 20 is coupled to the separator 10. In use, within a fluid processing apparatus 2, a mixture of untreated oil and water is pumped from the fluid store 20 through connection 11 into the separator 10. On entering the separator 10, the mixture is caused to rotate in the separation chamber, creating a cyclonic effect. As a result, the denser fluid is forced towards the edge of the separation chamber, while the less dense fluid is retained in the axial center of the separation chamber. As a result, the water and oil are separated and can be extracted from the clean water outlet 14 and the oily waste outlet 16 respectively.

After the mixture of oil and water that was initially held in the fluid store 20 leaves the separator 10, it is divided into two components that pass through the clean water outlet 14 and the oily waste outlet 16. Ideally, these components would be pure water and pure oil respectively. However, in practice there may be a mixture of fluids in each component. One reason for this is that the proportions of oil and water in the initial mixture must be reflected in the proportions of the total fluid which is extracted through the different outlets. For example, if the initial mixture contains only 20% oil, but the oily waste outlet 16 removes 50% of the fluid from the separator, it is clear that the component in the oily waste outlet 16 will contain some water.

The oily waste fluid that leaves the separator 10 through oily waste outlet 16 may be returned to the fluid store 20 through a fluid connection 23. Similarly, the clean water that leaves the separator 10 through clean water outlet 14 can be returned to the fluid store 20 through a fluid connection 24. The amount of fluid returning to the fluid store 20 through each of the fluid connections 23 and 24 is regulated by automated control valves 17 and 15 respectively. A level control valve 22 is coupled to monitor the interface between water and oil phases of the mixture in fluid store 20. As such, level control valve 22 may be automatically opened or closed to allow clean water to leave from the fluid treatment system through outlet 26 according to the interface level of water and oil in fluid store 20. Control valve 15 reacts to the action of level control valve 22 in order to maintain a constant flow rate through separator 10. For example, if the interface level in the fluid store 20 is too low, level control valve 22 will close to reduce the amount of fluid leaving the fluid processing apparatus 2. However, as level control valve 22 closes, it will cause the flow rate of fluid through the separator 10 to reduce. Consequently, control valve 15 then opens to maintain the desired flow rate through separator 10 while returning fluid to the fluid store 20 that can no longer leave the system through level control valve 22.

FIG. 2 also shows a bypass line 25 that allows the mixture of water and oil to bypass the separator 10 should, for example, the separator channels become obstructed to prevent fluid flow through separator 10. In this situation, valves 27 and 29 must be closed manually and valve 28 must be opened manually.

Once fluid has passed through the level control valve 22 to leave the fluid processing 5 apparatus 2, it reaches the downstream treatment (not shown in FIG. 2) via outlet 26, in which one or more further steps of purification may be carried out, for example, to remove impurities from the water.

Figure 3:
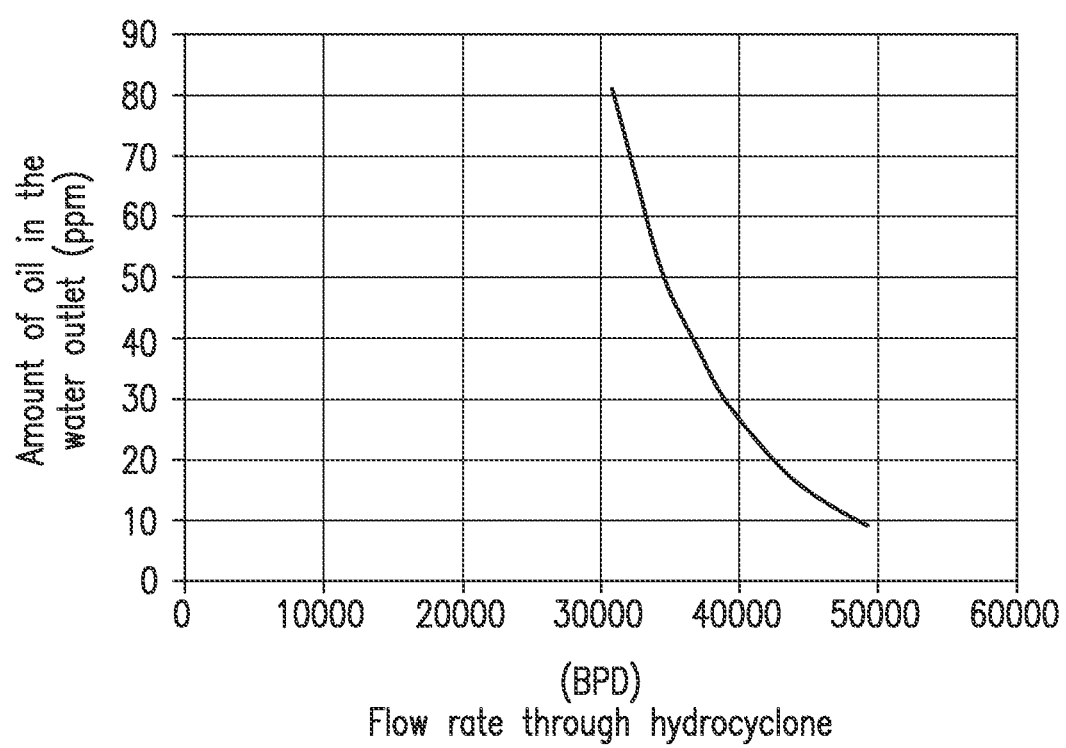
FIG. 3 is a graph that illustrates how oil concentration in the water outlet of a hydrocyclone varies with flow rate of fluid through the hydrocyclone.

The graph of FIG. 3 represents the amount of oil in the fluid at the clean water outlet in parts per million as a function of flow rate through a hydrocyclone for a typical set of operating conditions. The curve illustrates what happens when the flow rate of untreated fluid that is fed to the hydrocyclone separation system varies; a higher flow rate increases the separation efficiency while a lower flow rate decreases the separation efficiency. Therefore, oil removal performance is dependent on flow rate through the hydrocyclone. However, in an industrial environment, it may be beneficial for the separation efficiency of the hydrocyclone to be constant.

Figure 4:
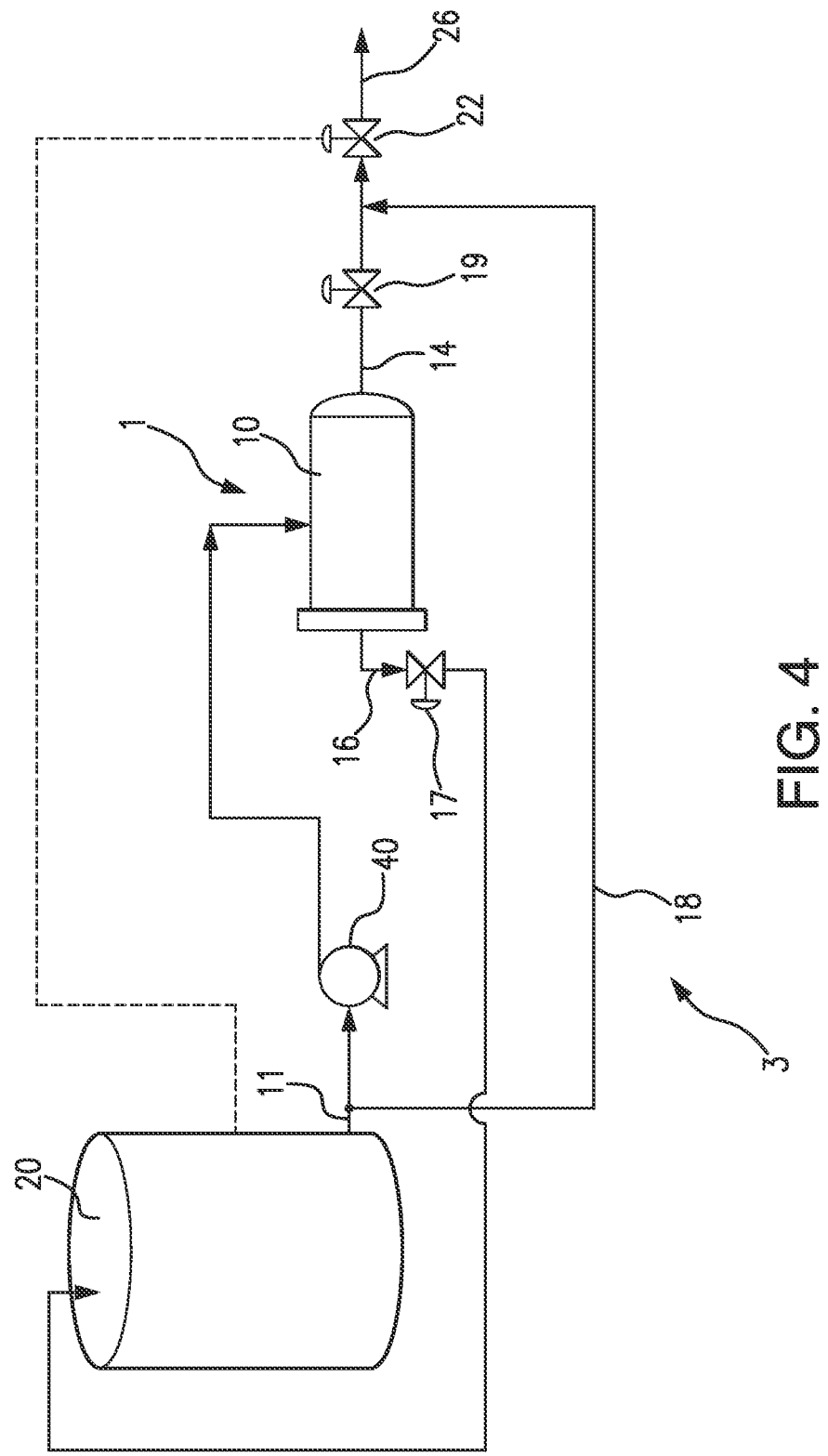
FIG. 4 illustrates a fluid processing apparatus according to an embodiment of the present invention.

A fluid processing apparatus 3 in accordance with an embodiment of the present invention is illustrated in FIG. 4. The separator 10 is a deoiling hydrocyclone and the first and second outlets of the separator 10 are the clean water outlet 14 and oily waste outlet 16 respectively. Control valve 19 ensures that a back pressure is created at the clean water outlet 14 of the separator 10 such that oily waste fluid is forced through oily waste outlet 16. Control valve 17 is optionally added to regulate the flow of oily waste back to fluid store 20. In accordance with this embodiment, there is provided a conduit 18 that connects the clean water outlet 14 to the inlet to the pump 40. Therefore, pump 40 draws in fluid from both the untreated mixture of water and oil and the clean water outlet 14. Preferably, the pump 40 is operated to draw in fluid at a constant flow rate that is higher than the maximum instantaneous flow rate of the untreated mixture of water and oil. This ensures both increased and constant flow rate of fluid through the separator 10, which in turn creates an increased and constant separation efficiency of the fluid treatment system 1.

One difference between the present invention and known fluid treatment systems is the configuration and positioning of the recycle line and its dual functionality as a bypass line. Instead of a fluid connection between the clean water outlet 14 of the separator 10 and the upstream fluid store 20 along with control valve 15, there is a conduit 18 that connects the clean water outlet 14 to the inlet of the pump 40. One advantage of this arrangement is the constant flow rate of fluid through the separator 10, which denotes a constant separation efficiency of the fluid treatment system 1. Another advantage is that the pressure difference between the upstream fluid store 20 and the clean water outlet 14 and oily waste outlet 16 is no longer required. Consequently, the upstream fluid store 20 can be operated at any pressure that is appropriate, irrespective of the pressure required by the separator 10. Further, there is no need to make modifications to the fluid store 20 in order to implement the present invention upon existing fluid processing apparatus 3. Further, the conduit 18 has no control element associated with it and can therefore act as both a recycle line and a bypass line, thus eliminating the complexity of separate recycle and bypass lines together with their required network of manually controlled valves.

Another significant advantage of this system is that it provides unlimited turndown for the fluid treatment system 1. Even if the flow of untreated mixture in connection 11 feeding the separator 10 drops to zero, the system will still continue to function removing whatever oil remains in the water. Because the oily waste fluid is returned to the upstream fluid store 20, the only point for fluid to leave the system is through the outlet 26, and therefore, the water volume in the fluid treatment system 1 will remain constant until additional water accumulates in the fluid store 20 and causes the level control valve 22 to open and pass treated water out of the system though outlet 26.

Figure 5:
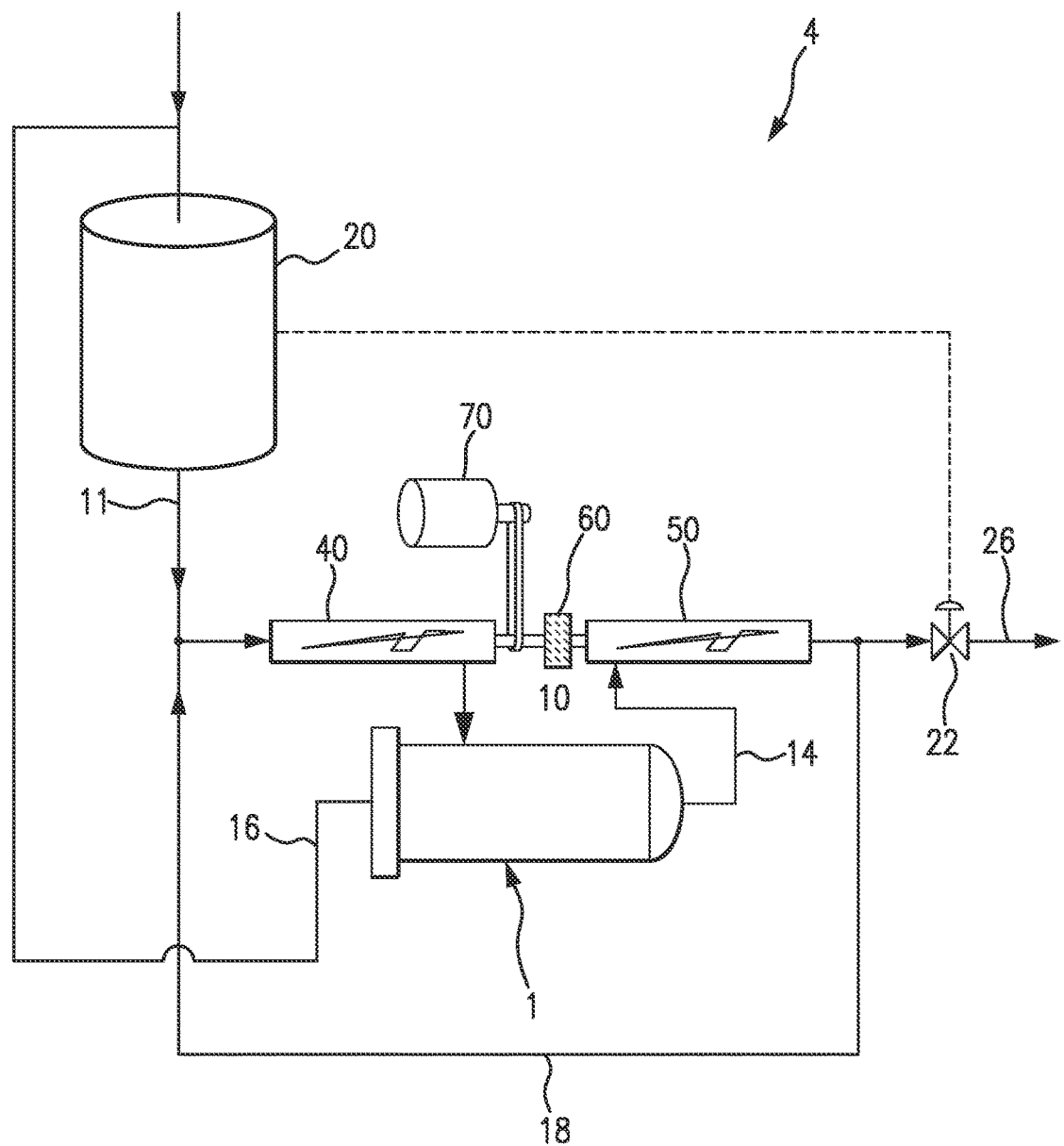
FIG. 5 illustrates a fluid processing apparatus according to another embodiment of the present invention.

A fluid processing apparatus 4 in accordance with another embodiment of the present invention is illustrated in FIG. 5. In addition to the components shown in FIG. 4, an energy harvester 50 that is coupled to the clean water outlet 14 of the separator 10 is provided in replacement of control valve 19 (as shown in FIG. 4), and the conduit 18 is positioned after the energy harvester 50. The energy harvester 50 advantageously does not create turbulent shear forces at its outlet, in contrast to control valve 19. Further, energy harvester 50 turns pressure energy at the clean water outlet 14 into mechanical energy. An energy transfer mechanism 60 is provided to apply this energy to the pump 40.

A drive mechanism 70 is further provided. In the preferred embodiment, the drive mechanism is coupled to the energy transfer mechanism 60, but it may be coupled to other parts of the system as appropriate. For instance, the drive mechanism may be coupled to the pump 40 or the energy harvester 50.

In the preferred embodiment, the energy harvester 50 is a progressive cavity motor. Accordingly, as fluid passes through the energy harvester 50, this causes rotation of a rotating shaft. In other embodiments, the energy harvester 50 may take other forms. Examples of other energy harvesters which may convert pressure energy, or hydraulic energy, into mechanical energy include gear motors or reciprocating hydraulic engines.

Similarly, in the preferred embodiment, the pump 40 is a progressive cavity pump. This means that fluid can be forced through the pump 40 by rotation of a rotating shaft, or the drive shaft. In other embodiments, the pump 40 may take other forms, such as, a gear pump or a reciprocating hydraulic pump.

The energy transfer mechanism 60 of the preferred embodiment can be considered a torque transfer device, arranged to transfer torque from the rotating shaft of the energy harvester 50 to the rotating shaft of the pump 40. The energy transfer mechanism 60 is arranged to ensure a fixed ratio between the speeds of rotation of the rotating shafts of the pump 40 and the energy harvester 50. Accordingly, a fixed volumetric ratio of fluid passes through the pump 40 and the energy harvester 50. As a result, the ratio of fluid through the inlet 12 and the clean water outlet 14 of separator 10 is fixed, which in turn fixes the relative proportion of fluid which passes through the oily waste outlet 16.

As an alternative to controlling the speeds of rotation of the pump 40 and the energy harvester 50, or in addition to such control, the skilled person may fix different volumetric capacities for the pump 40 and the energy harvester 50. For example, the pump 40 and the energy harvester 50 may operate at the same speed but result in differential fluid flow rates. In this case, the volumetric capacity of the two devices would be set at the desired ratio. Examples include a piston, plunger, or diaphragm arrangement where both the pump 40 and the energy harvester 50 have the same piston and cylinder diameter, and are connected to a common crankshaft acting as the energy transfer mechanism 60. In this case, the volumetric difference in flow rate through the pump 40 and the energy harvester 50 may be achieved by mounting connecting rods at different radius lengths from the centre of the shaft such that the energy harvester 50 has a shorter stroke length with smaller volumetric displacement than the pump 40. In an alternative, the radius lengths and thus stroke length may be identical, while the piston and cylinder diameter is different for the pump 40 and the energy harvester 50.

In the preferred embodiment, the energy transfer mechanism 60 is a mechanical gear reducer. However, alternative implementations are envisaged, such as a sheave and belt system, a chain and sprocket, or an electronic rotational speed controller.

The drive mechanism 70 of the preferred embodiment comprises an electric motor and electronic speed control, for example, a variable frequency drive. The electric motor is coupled to the energy transfer mechanism 60 and can thus control the rate of fluid flow through the pump 40 and the energy harvester 50. As mentioned above, the coupling of the pump 40 and the energy harvester 50 via the energy transfer mechanism 60 ensures that varying the rate of flow through the system does not vary the proportions of fluid in each of the inlet 12, the clean water outlet 14 and the oily waste outlet 16 of the separator 10.

Figure 6:
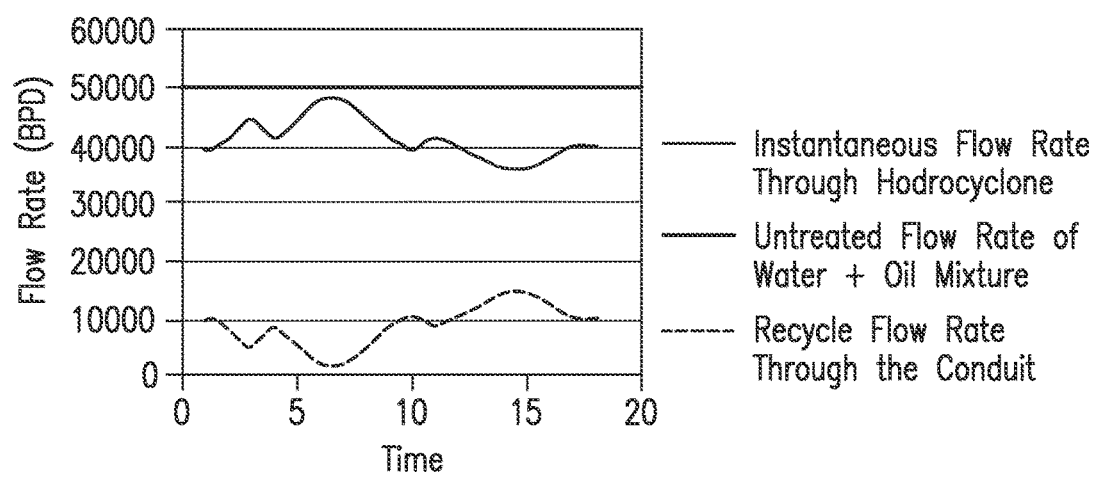
FIG. 6 is a graph that illustrates the flow rates across various channels of the fluid treatment system according to the embodiments of FIGS. 4 and 5.

FIG. 6 is a graph which illustrates the flow rates across various channels of the fluid treatment system in accordance with the preferred embodiment of the present invention as shown in FIGS. 4 and 5. In FIG. 6, it can be seen that the flow rate of fluid through the separator 10 is maintained at a constant rate, which results from the amalgamation of fluid from both the untreated mixture of water and oil as well as a proportion of fluid from the clean water outlet 14. The proportion of fluid from the water outlet 14 that is drawn in by pump 40 is equivalent to the difference between the desired flow rate of fluid through the separator 10 and the instantaneous flow rate of untreated mixture of water and oil. The method of selecting a desired constant flow rate at which fluid is to flow through the separator 10 is an optimisation process. If the selected constant flow rate is set too low, and the flow rate of the untreated mixture of water and oil exceeds said selected constant flow rate, then some of the untreated mixture of water and oil could be forced to flow in a direction towards the clean water outlet 14, which would lead to contamination of the clean water outlet 14. However, if the selected constant flow rate if set too high, then the fluid treatment system 1 consumes a large amount of energy in recycling fluid from the clean water outlet 14 of the separator 10 to its inlet 12.

As mentioned above, various aspects of the preferred embodiment may be modified as required. For example, the form of the pump 40 and the energy harvester 50 may be varied according to requirements.

Other variations and modifications will be apparent to the skilled person. Such variations and modifications may involve equivalent and other features which are already known and which may be used instead of, or in addition to, features described herein. Features that are described in the context of separate embodiments may be provided in combination in a single embodiment. Conversely, features which are described in the context of a single embodiment may also be provided separately or in any suitable sub-combination.

It should be noted that the term "comprising" does not exclude other elements or steps, the term "a" or "an" does not exclude a plurality, a single feature may fulfil the functions of several features recited in the claims and reference signs in the claims shall not be construed as limiting the scope of the claims. It should also be noted that the Figures are not necessarily to scale; emphasis instead generally being placed upon illustrating the principles of the present invention.

The invention claimed is:

1. A treatment system, comprising:
   a store containing a mixture;
   a cyclone separator having a separating chamber, an inlet for receiving an influent into the separating chamber, a first outlet for discharge of a first effluent from the separating chamber, and a second outlet for discharge of a second effluent from the separating chamber;
   a conduit without a valve, the conduit having a first end connection without a valve and directly coupled to a first fluid line located downstream of the store, the conduit having a second end connection without a valve and directly coupled to a second fluid line located downstream of the cyclone separator, wherein the conduit allows two-directional flow between the inlet and the first outlet for recycling a portion of the first effluent through the cyclone separator and for bypassing the cyclone separator;

an energy harvester at the first outlet and upstream of the conduit arranged to harvest pressure energy from the first effluent;

a pump at the inlet that is arranged to draw the portion of the first effluent from the conduit and the mixture from the store; and an energy transfer mechanism arranged to transfer the harvested energy to the pump, wherein the energy transfer mechanism is arranged to ensure a fixed volumetric ratio of influent that passes through the pump to first effluent that passes through the energy harvester.

2. A treatment system according to claim 1, wherein the first effluent has a greater density than the second effluent.

3. A treatment system according to claim 1, wherein the energy harvester is arranged to convert pressure energy into mechanical energy.

4. A treatment system according to claim 3, wherein the energy harvester comprises a progressive cavity motor.

5. A treatment system according to claim 3, wherein the energy transfer mechanism comprises a torque transfer device.

6. A treatment system according to claim 1, further comprising a drive mechanism coupled to at least one of the pump, the energy harvester or the energy transfer mechanism.

7. A fluid processing apparatus comprising a treatment system according to claim 1, and a control valve after the conduit, the control valve operating to control the flow of fluid leaving the processing apparatus.

8. A fluid processing apparatus according to claim 7, wherein the store is an upstream pre-separator vessel.

9. A fluid processing apparatus according to claim 8, wherein the second outlet of the separator is in fluid communication with the store.

10. A fluid processing apparatus according to claim 9, wherein the control valve after the conduit is coupled to the store and automated to control an interface in the store.

11. A treatment system according to claim 1, wherein the first end connection is arranged to draw the portion of the first effluent directly from the conduit into the pump while drawing the mixture from the store.

* * * * *